United States Patent
Pia et al.

[11] Patent Number: 6,018,906
[45] Date of Patent: Feb. 1, 2000

[54] MUSHROOM BED STRUCTURE

[76] Inventors: Richard E. Pia, 315 N. Broad St., Kennett Square, Pa. 19348; Gabriel F. Valentino, 521 Morriseinna La., Chatham, Pa. 19318

[21] Appl. No.: 09/015,579

[22] Filed: Jan. 29, 1998

Related U.S. Application Data

[60] Provisional application No. 60/034,893, Jan. 31, 1997.

[51] Int. Cl.[7] ................................................ A01G 1/04
[52] U.S. Cl. ........................................................ 47/1.1
[58] Field of Search ............................ 47/1.1, 14, 15, 47/16, 17, 19, 39, 59, 65.6, 78

[56] References Cited

U.S. PATENT DOCUMENTS

| | | | |
|---|---|---|---|
| 110,122 | 12/1870 | Dickens | 209/253 |
| 396,459 | 1/1889 | Bertrand | 47/66.1 |
| 1,730,489 | 10/1929 | Wigley | 210/602 |
| 1,808,383 | 6/1931 | Steves | 47/1.1 |
| 1,996,898 | 4/1935 | Brandell | 47/65.6 |
| 2,591,213 | 4/1952 | Stupin | 426/506 |
| 3,118,249 | 1/1964 | Bard | 47/1.1 |
| 3,242,614 | 3/1966 | Thompson | 47/1.1 |
| 3,286,398 | 11/1966 | Stengel | 47/1.1 |
| 3,375,607 | 4/1968 | Melvold | 47/74 |
| 3,415,012 | 12/1968 | Stubbmann | 47/78 |
| 4,062,148 | 12/1977 | Edmonds | 47/76 |
| 4,250,664 | 2/1981 | Remke | 47/76 |
| 4,750,292 | 6/1988 | Alstig | 47/30 |
| 5,040,328 | 8/1991 | Coon | 47/1.1 |
| 5,471,788 | 12/1995 | Willes | 47/75 |

FOREIGN PATENT DOCUMENTS

| | | | |
|---|---|---|---|
| 2567361 | 7/1984 | France | 47/65.6 |
| 2236040 | 3/1991 | United Kingdom | 47/1.01 |

*Primary Examiner*—Michael J. Carone
*Assistant Examiner*—Jeffrey L. Gellner
*Attorney, Agent, or Firm*—Connolly Bove Lodge & Hutz LLP

[57] ABSTRACT

A mushroom bed includes open grate as the center section of the floor with wood on each of its sides to complete the floor and with vertical wooden sides. A plastic grid type glider is mounted over the floor. Such glider could be used over the novel grate/wood floor or over conventional all wood floors.

23 Claims, 2 Drawing Sheets

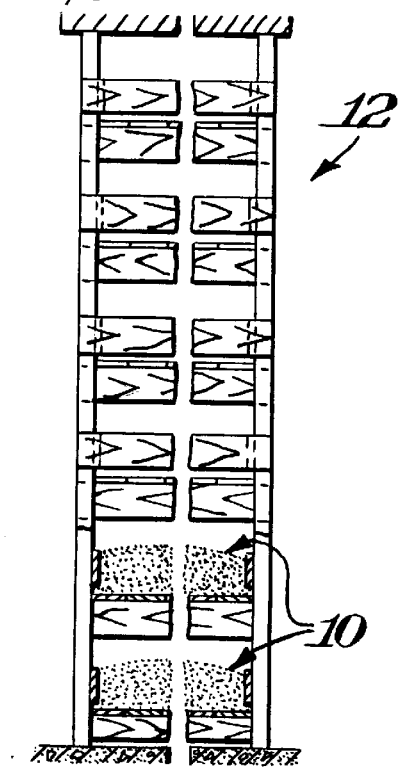
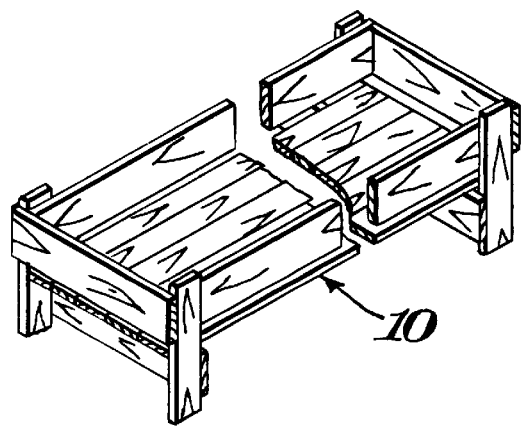
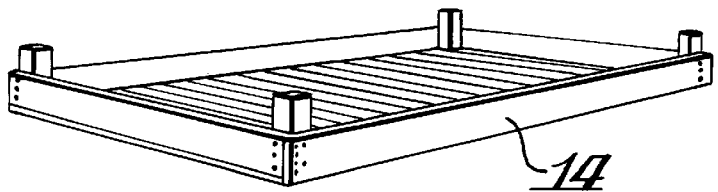
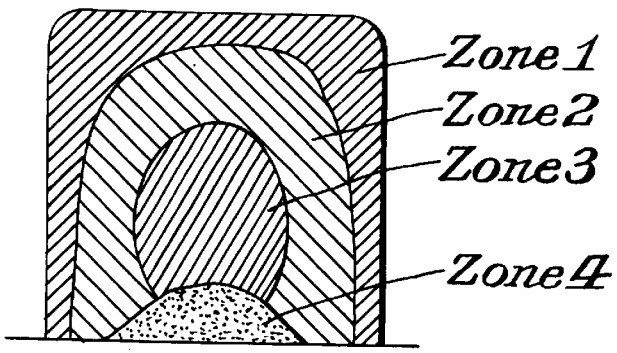

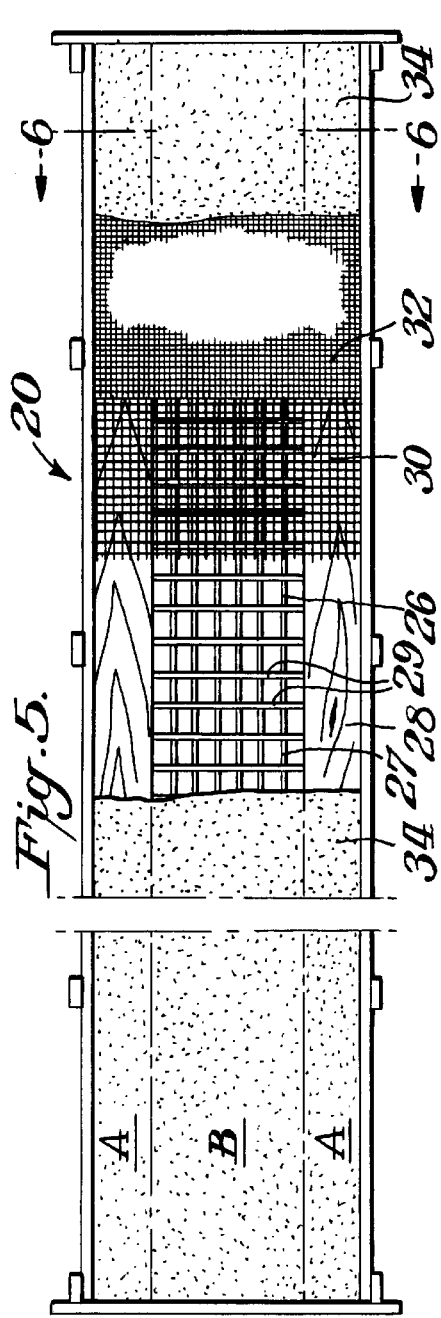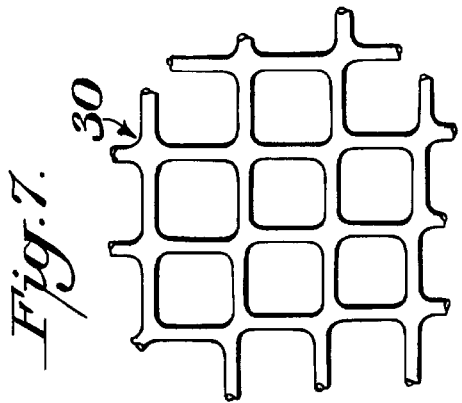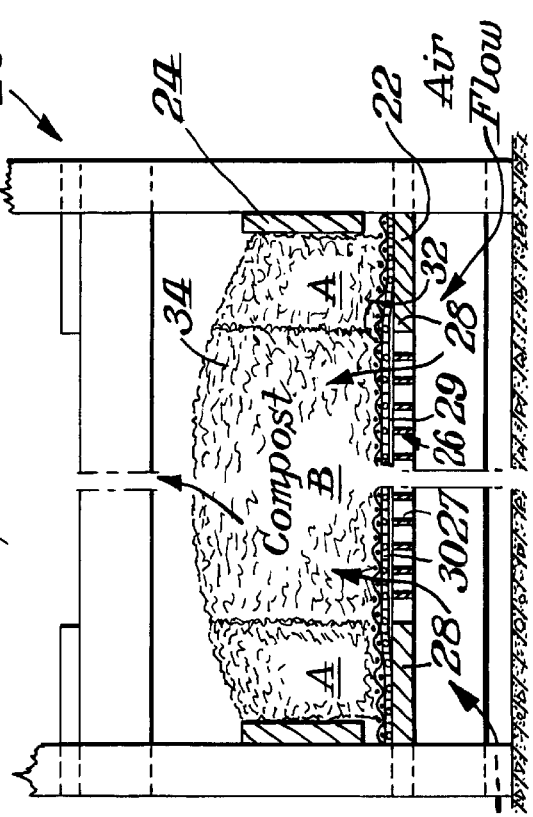

MUSHROOM BED STRUCTURE

CROSS REFERENCE TO RELATED APPLICATION

This application is based upon provisional application Ser. No. 60/034,893, filed Jan. 31, 1997.

BACKGROUND OF THE INVENTION

Mushrooms have been grown commercially in the United States and other countries for many years. There are several methods of commercial mushroom cultivation, however, the bed (a.k.a. shelf) and the tray system have been the most popular. In the bed system the receptacles for growing mushroom are stationary. In the tray system, however, the receptacles are portable and can be moved from place to place. Other, less popular, methods of growing mushroom have been the bag system, the ridge bed system and deep trough system.

In the bed system mushrooms are grown in wooden receptacles which are approximately 65" wide×60 foot long. These receptacles may be wider or narrower than 65" and/or they can be shorter or longer than 60 feet long. The depth of these receptacles is generally from 6" to 8" deep, however, they can be any suitable size. In what is referred to as a mushroom house these receptacles are usually stacked in four tiers, In each of these tiers six receptacles are usually stacked in a superimposed arrangement so that one mushroom house contains 4 tiers and 24 receptacles.

In the tray system mushrooms are also grown in wooden receptacles. These receptacles or trays can be square or rectangular, however, the most popular size is 48" wide×72" long×8" deep. In a farm using the tray system approximately 220 of these trays are put into one growing room. The trays are generally stacked four to five trays high and are arranged in eleven rows four stacks to a row. A typical mushroom tray is about 175 cm. long by 120 cm. wide with the tray height being 17.5 cm. and the corner post extending upwardly from the tray sides a further distance of about 12.5–15 cm.

Mushrooms are grown on decaying organic material. This material can be horse manure, hay, cereal straw or a variety of other vegetable wastes. The breakdown of this organic material is accelerated by the mushroom grower by composting. In mushroom growing there are two stages to the composting operation: an outdoor phase generally referred to as Phase I Composting and an indoor phase generally referred to as Phase II Composting. The purpose of composting is to convert the crude, often variable, raw material into a medium rich in nutrition which is specific for the growth of mushrooms.

In the outdoor Phase I Composting the material to be composted is stacked into windrows by a compost turning machine. These windrows can be from 5 ft. to 8 ft. wide and from 5 ft. to 8 ft. high by any length. At this time supplements can be added to the base composting material, for example, chicken manure, and/or protein rich vegetable materials, e.g., cotton seed meal, soya bean meal etc. These supplements have the effect of increasing the microbial populations greatly and also increase the nitrogen content of the final product. Both of these factors are considered important for good yields. After these initial windrows have been formed they may be turned occasionally by the compost turner for the purpose of mixing, watering and aerating the windrow. During this stage the windrow will begin to heat within 24 hours and temperatures as high as 180° F. can be achieved in some parts of the stack. It was learned many years ago that the most productive (in terms of mushroom production) compost is one that is well aerated and held within a specific temperature range during the outdoor composting period e.g. 122° F. to 150° F. It is extremely hard, however, to expose all of the compost to these conditions because of outside atmospheric conditions and because of restricted aeration in various parts of the windrow. FIG. 4 is an example of the zonation that occurs during Phase I. Ideally all of the compost should be exposed to conditions as shown in Zone 2.

After the outdoor composting phase or Phase I, the compost is brought into the growing room by conveyors and filled in the beds or trays that have been previously described. At this time the compost is ready for the indoor composting stage which is commonly called Phase II. The purpose of Phase II is to complete the process which began outdoors in Phase I, however, to do so under controlled conditions so that all of the compost receives the most favorable conditions of Zone 2 of the outside compost windrow. Furthermore, the compost can be uniformly subjected to a period of high temperature which will pasteurize it and ensure that it is free from most mushroom pests and diseases. Because of the construction of the bed or trays is extremely hard to get uniform temperatures during Phase II. Uniformity of the temperature in a mushroom growing bed is crucial, however, due to the construction of the beds this is not possible. The temperature along the sides of the bed (shown in FIG. 6 as "A") is always colder than the temperature in the center of the bed (shown as "B"). This is a disadvantage when bringing the compost up to temperature because when the center of the bed has reached the optimum temperature the sides are still cold. Also when bringing the bed temperature down from, for example, 140° to 80° F., in preparation for spawning when the sides have reached the optimum of 80° F., the center of the bed is still too hot to plant the spawn. For these reasons the mushroom farmer has to constantly make compromises during Phase II as well as the rest of the growing cycle. If these temperature differentials could be overcome, the growing cycle could be shortened and the amount of mushrooms grown in one crop could be increased which would greatly increase the profitability of a farm. There would also be a substantial savings in heating and cooling energy if the above mentioned temperature differentials could be overcome.

The complete Phase II process takes approximately 10 days. At the end of this ten day process the bed temperatures are brought down to approximately 58° F. and prepared for the next operation which is spawning. The mushroom beds (or trays) are then spawned (which is similar to the planting of seed in conventional farming) and supplemented. The next 14 days are commonly referred to as "spawn run". During this time frame the temperatures begin to rise because of the biological activity of the spawn and air conditioning must be used to hold the temperature at the level of 58° F. The same temperature zonation that was experienced during Phase II composting occurs during the spawn run stage and throughout the growing cycle.

After approximately 14 days the mushroom spawn has completely overtaken the compost and at this time a casing layer of peat moss or other suitable material is applied to the top of the compost.

Mushrooms will not occur in great numbers unless this casing layer is applied to the bed of compost. Approximately 18 to 22 days after casing mushroom appear and may be harvested.

SUMMARY OF THE INVENTION

It is an object of this invention to provide an improved mushroom growing receptacle for the bed and tray systems.

It is also an object of this invention to provide a mushroom growing bed or tray that overcomes the temperature differential of prior art.

It is also an object of this invention to provide a mushroom growing bed or tray which is more energy efficient.

A further object of this invention is to provide a mushroom growing bed or tray that is capable of accelerating the growing cycle and of giving higher production.

Another object of this invention is to provide a mushroom growing bed or tray that will have a greater flow of air through the mushroom growing medium.

A still further object is to provide an improved glider net.

In accordance with one feature of this invention a metal grating is provided to function as the bottom or base of the bed or tray in the center area of the base with the horizontal sides and upstanding sides made of insulative type material such as wood. The openness of the grating in combination with the insulated sides serves to equalize the temperature.

A further practice of the invention involves the use of an open grid type glider made of a low friction material such as plastic which would be located on the base of the bed, whether the bed be a conventional bed or a bed having a central portion made of the grating.

THE DRAWINGS

FIG. 1 is an end elevation view of a prior art mushroom bed system;

FIGS. 2–3 are perspective views of a prior art mushroom bed and a prior art mushroom tray, respectively;

FIG. 4 is a cross-sectional showing of the temperature zones during Phase I;

FIG. 5 is a top plan view of a mushroom bed in accordance with this invention;

FIG. 6 is a cross-sectional view taken through FIG. 5 along the line 6—6; and

FIG. 7 is a top plan view of a glider in accordance with this invention.

DETAILED DESCRIPTION

The present invention provides a technique for equalizing the temperature of the compost in the mushroom bed. The invention may also be used with other forms of mushroom growing receptacles such as trays or tunnels. Accordingly, the term mushroom growing receptacle is meant to include all such forms such as a bed, tray or tunnel. FIGS. 1–2, for example, show a portion of a mushroom bed system wherein a plurality of mushroom beds 10 are mounted in stacked form in a tier 12. Typically, each tier 12 would contain six beds 10 and a mushroom house would include four such tiers. FIG. 3 illustrates a typical mushroom tray 14. Reference is made to provisional application Ser. No. 60/034,893, all of the details of which are incorporated herein which shows additional views and lists dimensions for such prior art arrangements and for practices of the invention.

FIG. 4 illustrates the temperature zones that occur in Phase I in a compost rick or windrow. Such windrow is shown in proportions wherein the width is 5 feet to 8 feet and the height is also 5 feet to 8 feet. The length can be of any suitable dimension. In such windrow the temperature in Zone 1 is approximately 34° C. where the material is well-aerated, dry, undecomposed. In Zone 2 the temperature is between 55°–60° C. The material is well-aerated, decomposed with white flecks of fire fang, and with fungus clearly visible. In Zone 3 the temperature is 70°–80° C. with restricted aeration. In Zone 4 the temperature is approximately 35° C. and the material is yellow, foul-smelling and aerobic.

FIGS. 5–6 show a mushroom bed 20 in accordance with this invention having a base or horizontal bottom 22 with vertical side walls 24. The sides of the bed are indicated by the letter "A" while the center is indicated by the letter "B". In the prior art practices the temperatures in the areas A along the sides of the bed are always colder than the temperature in the center of the bed in the area B. In prior art arrangements the entire base and the vertical side walls are made of a material such as wood which is an insulative type material. The present invention as shown in FIGS. 5–6 provides a technique for equalizing the temperature wherein an open grating 26 would replace the center section of the bed floor from end to end. For example, as shown in FIGS. 5–6 the grating would extend below the portion of the compost indicated by the letter B. Insulative type material 28, such as conventional wood, would still be used at the side sections of the bottom 22 under the portion of the compost indicated by the letter A on each side of the central section and on the vertical sides 24 of the bed.

Preferably the grating is a galvanized steel grate which is relatively inexpensive. In a preferred practice of the invention the grating 26 is formed by having a plurality of parallel bars 27 located about 2⅜ inches apart with cross bars 29 in the form of rods disposed on top of such as in notches or on the straight upper surface of the bars 27. The rods are typically four inches apart from center to center while the bearing bars are typically about one inch high and have a thickness of 3/16 inches.

The use of such grating 26 differs from practices done in countries outside the United States, such as in Holland where attempts have been made to replace the wood bottom with pipes. In such practices, however, the pipes extended completely across the width of the bed and the bed includes metal sides, unlike the arrangements of FIGS. 5–6 where the grating is located only in the center section of the bed and insulative material such as wood is located along the side section of the bed base and up the side walls. The grating rests on and is supported by spaced cross pieces (not shown).

FIG. 5 illustrates the various layers of components in the bed 20. For example, the grate 26 having the bars 27 and rods 29 would be in the central section of the bed at the base or bottom 22 flanked by the insulated material or wood 28. A later described glider 30 would then be placed across the bottom 22 over insulative material 28 and central portion open grate 26. A conventional transport net material 32 would be placed on top of glider 30 and finally the compost 34 would be placed on top of the net material 32.

In accordance with a further aspect of the invention a novel glider 30 is provided, such as illustrated in FIG. 7, made of a porous material, preferably by being in the form of a grid which has a significantly high open area as compared to the solid area forming the grid. Such a significantly high open area should be such that one can readily see through the open spaces of the material. Preferably there should be at least 60% and more preferably at least two-thirds or three-quarters open area of the total glider area. The invention could broadly be practiced with a significantly high open area of lesser amount such as 50%, 25% and 10% or lower. The glider is preferably made of a plastic material, such as HDPE, having a low coefficient friction. As shown in FIG. 5 the glider 30 would be placed on top of the bed floor 22 below the conventional transport net 32. Compost 34 would be on net 32.

There are a number of distinct advantages by such a glider. For example, the glider 30 by being of open construction facilitates the flow of a greater amount of air into the compost particularly when used in conjunction with the open grate 26. The low friction of glider 30 facilitates sliding movement of the transport net 32. The glider 30 thus makes it easier to dump the compost. Additionally, the glider acts as a spacer between the conventional transport netting 32 and the floor of the bed thus providing a barrier space to minimize or reduce the amount of moisture from the netting 32 that would contact the floor. The use of the glider 30 to space the grate 26 from the net 32 increases the life of the grate by providing air spaces in the glider which keep the grate dry and prevent rusting.

It is to be understood that the glider may be used with conventional beds having completely wooden or solid floors or with the inventive beds having the center section formed with the grating.

A further advantage of the glider is that it provides less wear and damage to the belt and net. This is particularly advantageous when used with the metal grate which may have barbs or irregularities.

In prior art arrangements using only wood as the floor of the bed with a transport net and gliders of generally closed construction, there is a tendency for the compost to collect between the wood where the sheet drops down toward the wood. The accumulation of the compost cuts down the airflow and also creates the potential for disease. These disadvantages are avoided with the invention.

It is to be understood that although the invention has been particularly described with respect to mushroom beds of the type shown, for example, in FIGS. 5–6 the invention could also be used with other types of mushroom growing systems such as the tray system. Typical trays are 4 ft. by 4 ft. squares or 4 ft. wide by 6 ft. or 8 ft. rectangles. Where a tray is used, the grate would be square or rectangular at the central section of the floor completely surrounded by wood or other insulative material. Thus, the side sections and end sections of the bottom (as well as the vertical side walls) are made of solid insulative material (e.g. wood) completely surrounding the central grate. As shown in FIGS. 5–6 the combined width of the two side sections 28,28 is greater than one-half the width of the open central section where the grate 26 is located with no insulative material below the grate 26".

A further use of the glider feature is with tunnels. In some systems of mushroom growing, Phase II and spawn run are done in bulk in what is referred to as a tunnel. After Phase II is completed the compost is then transferred into the standard growing beds, previously described. These tunnels can be anywhere from 5 to 15 feet wide by anywhere from 50 to 150 feet long. In this design compost is filled approximately 6 feet high. Air is then pressurized (by means of a blower) into a plenum chamber and the air is "forced" through the mass of compost. A glider is put on top of the floor and then a heavy duty transport net is laid on top of the glider for the purpose of emptying the tunnel after Phase II or spawn run has been completed. This system could be practiced using the glider of this invention because of greater air flow, ease of cleaning, and less frictional resistance which would extend the life of the pulling net.

The invention thus provides a number of advantages over the prior art where used with the novel grate or where used with conventional receptacle structures. For example, the utilization of a glider reduces the potential from disease and reduces waste of compost. The combination porous glider and open grate enhances the air flow to lower the temperature in the center of the bed or tray thus providing an equalization of temperature with respect to the sides of the bed and with respect to the sides and ends of the tray.

The incorporation of the open grate in the center of the bed or tray in combination with the insulative material along the horizontal and vertical sides is advantageous in that air flow is enhanced in the center while is less at the sides. Additionally, there is a cost savings by utilizing cheaper wood material along the sides instead of the more expensive galvanized steel used for the grate. The glider spaces the grate from the net or belt material thus increasing the life of the grate. Moreover, the open spaces keep the grate dry. The utilization of the invention could result in an increase of mushroom production by, for example, 7% while simultaneously decreasing the disease factor by having better temperature control and minimizing disease creating conditions.

What is claimed is:

1. In a mushroom growing structure comprising a plurality of receptacles for holding a bed of compost, said receptacles being stacked atop each other, each of said receptacles including a generally horizontal bottom and generally vertical side walls, the improvement being in a glider on said bottom, said glider being made of an open grid material having a significantly high open area, and including a net mounted over said glider.

2. The structure of claim 1 wherein said glider is made of a material having a low coefficient of friction.

3. The structure of claim 1 wherein said bottom is made completely of insulative material.

4. The structure of claim 3 wherein said insulative material is wood.

5. The structure of claim 1 wherein said plurality of receptacles comprises a plurality of mushroom beds, each of said mushroom beds being in a respective one of said receptacles, and each of said mushroom beds being substantially longer in length than in width.

6. The structure of claim 1 wherein said structure is part of a mushroom bed system having a plurality of mushroom beds, each of said mushroom beds being in a respective one of said receptacles, and each of said mushroom beds being substantially longer in length than in width.

7. In a mushroom growing structure comprising a receptacle for holding a bed of compost, said structure including a generally horizontal bottom and generally vertical side walls, the improvement being in a glider on said bottom, said glider being made of an open grid material having a significantly high open area, a net mounted over said glider, said bottom comprising a central section and a side section on each side of said central section, and said central section being made of an open grate.

8. The structure of claim 7 wherein each of said side sections is made of an insulative material.

9. The structure of claim 8, wherein said structure is part of a mushroom bed system having a plurality of mushroom beds, each of said mushroom beds being in a respective one of said receptacles, and each of said mushroom beds being substantially longer in length than in width.

10. The structure of claim 9 wherein said side walls are made of insulative material.

11. The structure of claim 10 wherein said insulative material for said side walls, and said side sections is wood.

12. The structure of claim 11 wherein said mushroom bed system includes a plurality of said mushroom beds stacked in tiers, and there being a plurality of said tiers.

13. The structure of claim 8 wherein said grate is made from a plurality of parallel bars with a plurality of parallel rods intersecting said bars.

14. The structure of claim 13 wherein said receptacle is a mushroom bed substantially longer than it is wide and having a pair of opposite ends, and said grate extending from one of said ends to the other of said ends.

15. The structure of claim 7 wherein said receptacle is a mushroom tray having a central section surrounded by a pair of side sections and a pair of intermediate end sections, said grate being made of an open grid material, and each of said side sections and said end sections being made of an insulative material.

16. The structure of claim 15 wherein said insulative material is wood.

17. The structure of claim 7 wherein said receptacle is a mushroom bed substantially longer than it is wide and having a pair of opposite ends, and said grate extending from one of said ends to the other of said ends.

18. In a mushroom growing structure of the bed system having a plurality of mushroom bed receptacles for holding compost, each of said receptacles having a generally horizontal bottom and upstanding side walls, said bottom comprising a pair of opposite ends with a central section extending from one of said ends to the other of said ends and with a side section on each side of said central section extending from one of said ends to the other of said ends, the improvement being in that said central section is made of an open grate material in grid form, said side sections being made of an insulative material, the combined width of said side sections being greater than one-half the width of said central section where said open grate material is located, said side walls being made of insulative material, and said central section being substantially free of said insulative material between said side sections.

19. The structure of claim 18 wherein said mushroom bed system has a plurality of said receptacles stacked in tiers and further has a plurality of said tiers.

20. In a mushroom tray system having a tray receptacle with a generally horizontal bottom and upstanding side walls, said bottom comprising a central section surrounded by a pair of side sections and a pair of intermediate end sections for holding compost, the improvement being in that said central section is made of an open grate material, said side sections and said end sections being made of an insulative material, the combined width of said side sections being greater than one-half the width of said central section where said open grate material is located, said side walls being made of an insulative material, and said central section being substantially free of said insulative material between said side sections.

21. In a mushroom growing structure comprising a plurality of receptacles for holding a bed of compost, said receptacles being stacked atop each other, each of said receptacles including a generally horizontal bottom and generally vertical side walls, the improvement being in a glider on said bottom, and said glider being made of an open grid material having a significantly high open area, said system being a tray system, each of said receptacles being a mushroom tray having a central section surrounded by a pair of side sections and a pair of end sections, said grate being made of an open grid material, and each of said side sections and said end sections being made of an insulative material.

22. In a mushroom growing tunnel system comprising an elongated tunnel for holding a bed of compost, said tunnel including a bottom and side walls, the improvement being in a glider on said bottom, said glider being made of an open grid material having a significantly high open area, and a net mounted over said glider.

23. The system of claim 22 wherein said tunnel is from 5 to 15 feet wide and from 50 to 150 feet long.

* * * * *